June 19, 1945. J. PIERREL 2,378,498
DIAL COMBINATION FOR RADIO APPARATUS
Filed May 27, 1941
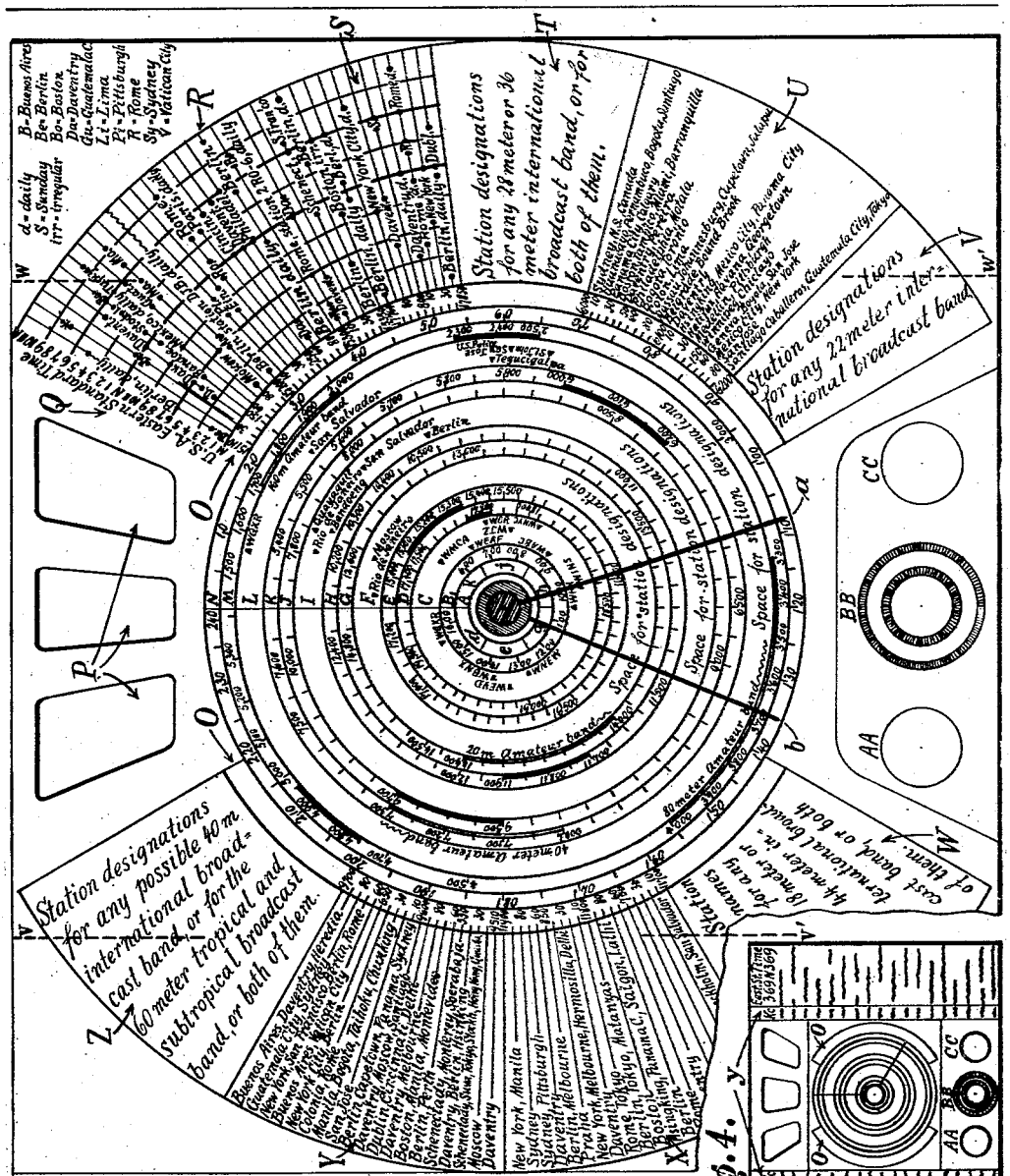
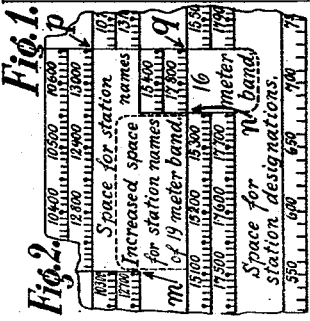
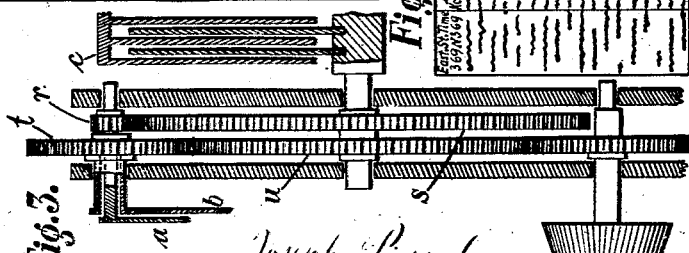
Joseph Pierrel
Inventor Patented June 19, 1945

2,378,498

UNITED STATES PATENT OFFICE 2,378,498

DIAL COMBINATION FOR RADIO APPARATUS

Joseph Pierrel, New York, N. Y.

Application May 27, 1941, Serial No. 395,423

10 Claims. (Cl. 116—124.2)

My invention relates to indicating dials used in connection with radio apparatus.

The object of my invention is a radio dial that will in particular render it easier for the general public to tune in short wave transmitters generally, and especially the stations of the international broadcast bands.

Radio dials of the present art featuring the short wave frequency range from about 5,000 kc. to about 20,000 kc. are commonly deficient by not showing the station designations of the short wave transmitters or showing only a relatively small number of them, and by not providing an amount of calibration spread sufficient for convenient tuning and for placing the station designations against the calibration scales.

One preferred embodiment of my invention combines on the dial chart, not too large for being acceptable to the general public, of a radio receiver the following features:

(a) The complete scale of the present short wave range from about 60 meters to about 15 meters;

(b) Sufficient bandspread in particular for the transmitter groupings now commonly known as international broadcast bands, so that the listener may be able to log a station more conveniently;

(c) Room for substantially all of the station designations of said international broadcast bands, that is to say at present, of about three hundred transmitters, plus about one hundred short wave transmitters distributed all over the short wave range.

Those features seem to be exclusive of each other but they are not so by the use of my invention.

Still other features are provided which will be disclosed in the following or will be apparent to those skilled in the art.

The means by which I realize my invention consists essentially in the interposition, between the tuning means and the corresponding indicating means, of an appropriate gearing means accompanied, on the dial chart, by a coiled calibration scale; a turn indicator indicating on which turn of the coiled scale the position of the tuning device has to be read off; and eventually a suitable staggering, around the rotational circle of the coiled calibration scale, of predetermined transmitter groupings such as the international broadcast bands, also a suitable displacement arrangement for tuning indicia; all as described in the following and illustrated in the drawing:

In the drawing chosen for illustrating my invention: Fig. 1 represents a front view of the dial chart. Fig. 2 represents an alternate displacement arrangement not shown in Fig. 1. Fig. 3 gives a side-view and cross section respectively of the gearing means; Fig. 4 shows a variation of the dial, in front view.

Beginning my detailed description with Fig. 3, we have there a pointer $a$ which for one 180° rotation of the tuning condenser $c$ will make six full turns, as the two cogwheels $r$ and $s$ are in the proportion of 1 to 12.

Corresponding to these six full turns described by the pointer $a$ we have on the dial chart, in Fig. 1, six concentric scales $D$, $E$, $G$, $H$, $J$ and $K$ which are in reality the six turns of one single scale extending from 5,300 kc. to 19,700 kc., coiled together in order to occupy less space.

Alongside those six scale turns we have the arcuate spaces $C$, $F$, $I$ and $L$ destined to receive a certain number of station designations.

As the outer ones of the six turns of the coiled scale, the turns $J$ and $K$, are situated at a greater distance from the center of rotation they show more calibration spread than the inner turns $D$ and $E$; this is no disadvantage, as more transmitters of public interest are distributed over the lower frequencies of the short wave range than over the higher frequencies and more space has to be provided, in the adjoining arcuate spaces $I$ and $L$, for the station designations of the lower frequencies. As to the particularly numerous station designations of the international broadcast bands, they are dealt with in a special manner as shown further below.

A means had to be provided to indicate on which one of the six turns of the coiled scale the actual position of the pointer $a$, with its successive revolutions, has to be read off. To this end a second pointer $b$ is mounted concentrically with pointer $a$ and geared to the tuning means in the ratio of 2 to 1 by means of the cogwheels $t$ and $u$, on Fig. 3. This slow moving pointer $b$ will therefore describe an arc of 60° every time the fast moving pointer $a$ describes a full circle, and the position of the pointer $b$ in the fields $d$, $e$, $g$, $h$, $j$ or $k$ respectively of the arcuate space A in Fig. 1 will indicate that the pointer $a$ has to be read off on the scale turn $D$, $E$, $G$, $H$, $J$ or $K$ respectively.

If there are on the dial chart other scales of the ordinary kind, that is, scales that have not been coiled, they may be used in connection with the slow pointer $b$ which thus, in those cases, becomes a main indicating pointer, aside of its function as turn indicator for the coiled scale, or scales. Thus in Fig. 1 pointer $b$ is the indicating means for the broadcast scale B and for the medium wave scale M, the fast pointer $a$ being eventually used as a vernier pointer in those instances.

The outermost scale N, on Fig. 1, is a general precision tuning scale divided in 240 divisions (one division for every ten kilocycles in the six turns of the coiled scale).

As to the numerous station designations of the international broadcast bands, they could not be accommodated in the arcuate spaces C, F, I and L without greatly increasing the latter's width, which in turn would unduly enlarge the dial chart. On the other side, by far the largest part of the thus widened arcuate spaces would remain empty as the international broadcast bands occupy only a small fraction of the short wave range.

One of the means to solve the problem is to project those international broadcast bands, in the direction of the pointer bar, into a space especially provided for them; and in order not to have them overlap in that space, those international broadcast bands are staggered, that is to say, they come to lie in different arcs of the rotational circle of the indicating means.

This staggering is obtained by giving the gearing means a suitable ratio of development which, in the case of Figures 1 and 3 is, as already mentioned, 1 to 12. It is obvious that several suitable staggering arrangements may be found, depending on the developing ratio of the gearing means and the capacity or inductance variation of the tuning means.

If the projection of transmitter groupings takes place on a dial chart that is flat or conical, it is advisable to effect the projection away from the center of rotation, thus providing additional bandspread for those particularly interesting, projected parts of the short wave range.

Thus we have in Fig. 1, beginning with the upper right hand corner and progressing in clockwise direction, the 19 meter band R projected out of scale E, the 16 meter band S projected out of scale D, the 49 meter band U projected out of scale K, the 25 meter band X projected out of scale H, and the 31 meter band Y projected out of scale J. No international broadcast bands have been allotted yet that would fill the spaces T, V, W and G; future 44, 40, 36, 28, 22 and 18 meter bands may be located there.

Along the general scale N are repeated, in bandspread, the projected calibration groups O of the international broadcast bands, thus greatly facilitating tuning.

A second means to provide space, this time within the group of turns of the coiled scale itself, for the numerous station designations of the international broadcast bands consists in enlarging the space destined to receive the station designations locally by shifting out of place, in the direction of the pointer bar, the portion of the scale, or scales, situated opposite the said international broadcast band, as has been shown for the 19 meter band in $m$ on Fig. 2. The section, containing the transmitter groupings with the numerous station designations, itself may be shifted as has been shown, on the same Fig. 2, in $n$ for the 16 meter band. Letters $p$ and $q$ mark the places where the two couples of scales that had been shifted out of place are shifted back in line with the rest of their respective scales.

Shifting as well as projecting take place in the direction of the pointer bar as construed lying over the shifted bar.

As the spaced allotted to the station designations of the international broadcast bands must be rather wide in order to accommodate the three or four or even more stations sometimes transmitting on the same wavelength, and as knowing the transmitting schedule is of importance in short wave listening, the idea suggested itself to arrange the station designations of the international broadcast bands in their allotted space in such a way that their position in that space would indicate their transmission schedule.

As indicated on Fig. 1 in Q, at the upper right hand corner beginning of the projected international broadcast bands, this space is divided into 24 concentric parts corresponding to the 24 hours of the day. The station designations are placed within the limits marking the beginning and the end of the transmission, eventually with such additional indications as "daily," "Sunday," "irregular," etc. Abbreviations will have to be used when the time of transmission is too short for the whole name. Those abbreviations may be explained in the four triangular spaces at the four corners of the dial chart.

Since transmitting stations change their frequency, and since new transmitters come in and old ones drop out, it is advisable to make the dial chart exchangeable by any suitable arrangement known in the art. Such printed replacement dial charts could be furnished to the owners of receiving sets about three or four times a year by an agency equipped for rendering that service.

As in Fig. 1 the international broadcast bands have been projected preferably sideways in order to place the names as horizontally as possible and facilitate their reading, space is left empty in the middle, at the bottom as well as at the top, of the front panel, and where may be located the controls AA, BB and CC, and the openings P for the loudspeaker. Thus, in spite of the large amount of tuning information given by the dial chart, the whole can be embodied on the front panel of a relatively small receiver, for instance a battery operated receiver to be taken out into the country side.

The size of the receiver can be further reduced by constructing the dial in such manner that the two sides of the dial chart can be folded over the middle along the dotted lines $vv'$ and $ww'$ (Fig. 1), thus forming a cover for the front panel when the receiver is not in use. It would be preferable, in that case, to avoid the folds $vv'$ and $ww'$ passing through the body of station designations by featuring the latter altogether on the movable flaps on horizontal lines in vertical column, the connection between the station designations and the pointer being established by featuring the frequency number of the transmitters in duplicate, once in the arcuate scales O and once alongside of the station designations in the vertical column $y$ as indicated in Fig. 4.

The arrangement of Fig. 4 may also be found preferable when bulk is not a problem and where the lists of station designations on both sides of the central dial chart are not mounted on movable flaps, but on the adequately enlarged receiver cabinet itself.

Staggering of the transmitter groupings that are to be projected is no strict requirement in the case of Fig. 4 as only sections of the calibration scale are properly projected, that is, projected in the direction of the pointer bar. Since said sections are rather narrow bands two of them may, in the case of overlapping, easily be laid parallel to each other instead of being strictly in single file, without unduly increasing the size of the dial chart.

What has been described here in detail for the international broadcast bands can of course also be done in regard to the amateur bands and any other transmitter groupings, in any frequency range of the radio spectrum, and for transmitting apparatus as well.

While I have thus shown and described my invention in some of its preferred forms, it is expressly understood that I do not wish to be limited thereto, but include all the various embodiments to which the principles here disclosed may apply.

I claim:

1. In radio apparatus having a continuously variable tuning means, rotatable indicating means including a dial chart and pointer adapted for indicating the setting of said variable tuning means, gearing connecting said indicating means with said tuning means for imparting to said indicating means a rotational movement of more than 360° for each complete movement of the tuning means from its position of maximum capacity to its position of minimum capacity, a calibration scale on said dial chart extending about the center of rotation of said indicating means through more than 360° in successive turns, and turn-indicating means connected with said tuning and main indicating means for indicating, on a separate, auxiliary scale, on which turn of said calibration scale to read the actual position of said tuning means.

2. An apparatus according to claim 1 in which the turn indicating means is arranged to rotate concentrically with the main indicating means.

3. An apparatus according to claim 1 in which at least one additional calibration scale extends about the center of rotation through no more than 360° and in which the turn-indicating means is arranged to rotate concentrically with the main indicating means and to serve simultaneously as a conventional indicating means in co-operation with said additional calibration scales.

4. An apparatus according to claim 1 in which the gearing has a development ratio such as to result in the relative staggering of predetermined transmitter groupings contained in at least two turns of at least one calibration scale extending about the center of rotation through more than 360°.

5. An apparatus according to claim 1 in which the turn-indicating means is arranged to rotate concentrically with the main indicating means, in which the gearing has a development ratio such as to result in the relative staggering of predetermined transmitter groupings contained in at least two turns of at least one calibration scale extending about the center of rotation through more than 360°, in which tuning indicia in at least one section of at least one turn of at least one calibration scale extending about the center of rotation through more than 360° are displaced in the direction of the pointer, and in which station designations are located, within a space divided into twenty-four collimating bands corresponding to the twenty-four hours of a day, across such of the hour calibrations as correspond to the transmission schedule of the designated station.

6. An apparatus according to claim 1 in which the gearing has a development ratio such as to result in the relative staggering of predetermined transmitter groupings located in at least two turns of at least one calibration scale extending about the center of rotation through more than 360°, and in which at least one of said staggered transmitter groupings is projected, in the direction of the pointer, into a predetermined space divided into twenty-four collimating bands representing the twenty-four hours of a day, and station designations placed across such of the hour calibrations as correspond to the transmission schedule of the designated station.

7. An apparatus according to claim 1 in which at least one additional calibration scale extends about the center of rotation through no more than 360°, in which the turn-indicating means is arranged to rotate concentrically with the main indicating means and to serve simultaneously as a conventional indicating means in co-operation with said additional calibration scale, in which said gearing has a development ratio such as to result in the relative staggering of predetermined transmitter groupings contained in at least two turns of at least one calibration scale extending about the center of rotation through more than 360°, in which the dial chart is flat and at least one of said staggered transmitter groupings is projected, in the direction of the pointer into a space farther removed from the center of rotation of the tuning means thereby providing increased bandspread for the thus projected transmitter grouping, in which said space is divided in twenty-four concentric bands representing the twenty-four hours of the day, and in which the station designations of the projected transmitter groupings are placed across such of said concentric hour calibrations as correspond to the transmission schedule of the designated station.

8. An apparatus according to claim 1 in which additional calibration scales extend about the center of rotation of said indicating means through not more than 360°, in which the turn-indicating means is arranged to rotate concentrically with the main indicating means and to serve simultaneously as a conventional indicating means in co-operation with said additional calibration scales in which the dial chart is flat and in which sections of calibration scales are projected, along the direction of the pointer, into a space further removed from the center of rotation of said indicating means than said calibration scales whereby additional bandspread is provided for said projected sections of said calibration scales.

9. An apparatus according to claim 1 in which the turn-indicating means is arranged to rotate concentrically with the main indicating means, in which the gearing has a development ratio such as to result in the staggering of predetermined transmitter groupings contained in at least two turns of at least one calibration scale extending around the center of rotation through more than 360°, and in which adjacent to the groups of station designations of said transmitter groupings, sections of calibration scale are shifted out of place in the direction of the pointer whereby the spaces designed to receive the station designations are enlarged to provide room for the large number of station designations of said transmitter groupings.

10. An apparatus according to claim 1 in which additional calibration scales extend about the center of rotation of said indicating means through not more than 360°, in which the turn-indicating means is arranged to rotate concentrically with the main indicating means and to serve simultaneously as a conventional indicating means in co-operation with said additional calibration scales, in which said gearing has a development ratio such as to result in the staggering of at least one transmitter grouping contained in a calibration scale extending around the center of rotation through more than 360°, relatively to at least one transmitter grouping contained in a calibration scale extending around the center of rotation through not more than 360°; in which the various parts of the dial chart are at different distances from the axis of rotation of the indicating means, and in which transmitter groupings are projected, along the direction of the relevant pointer, into a space farther removed from the center of rotation of said indicating means than said calibration scales, to thereby provide additional bandspread for said projected transmitter groupings.

JOSEPH PIERREL.